Dec. 3, 1935. R. F. GORDON 2,022,959
SEAT VENTILATING AND COOLING DEVICE FOR AUTOMOBILES
Filed Jan. 18, 1934 2 Sheets-Sheet 1
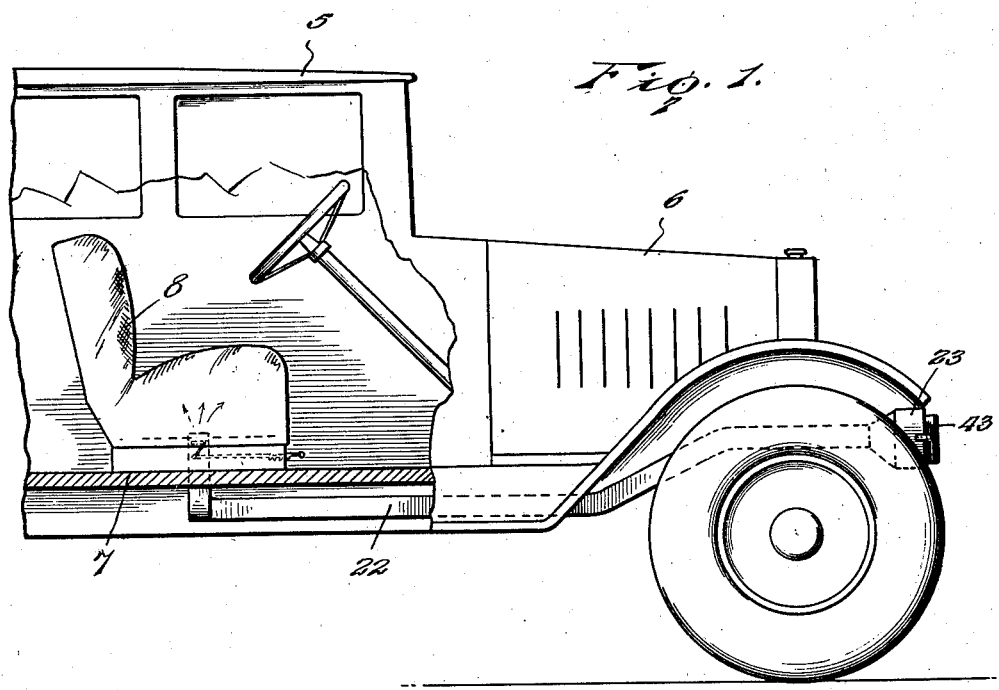
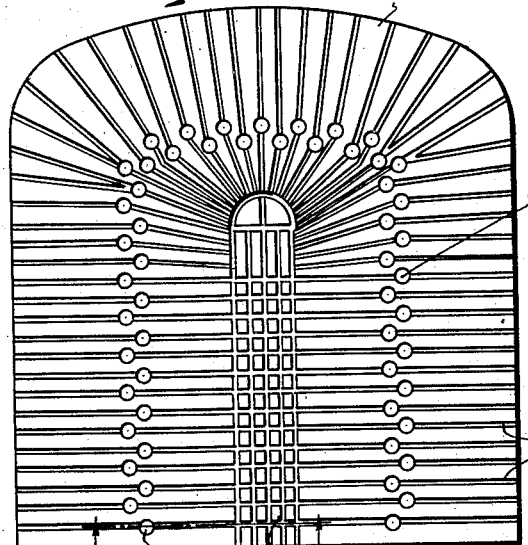
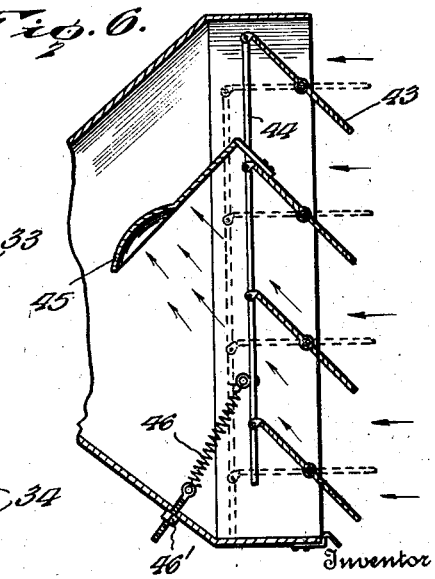
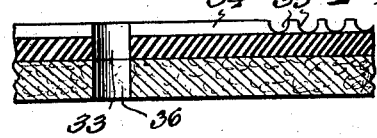
Inventor
Roy F. Gordon.
By Lacey & Lacey, Attorneys Dec. 3, 1935.   R. F. GORDON   2,022,959
SEAT VENTILATING AND COOLING DEVICE FOR AUTOMOBILES
Filed Jan. 18, 1934   2 Sheets-Sheet 2
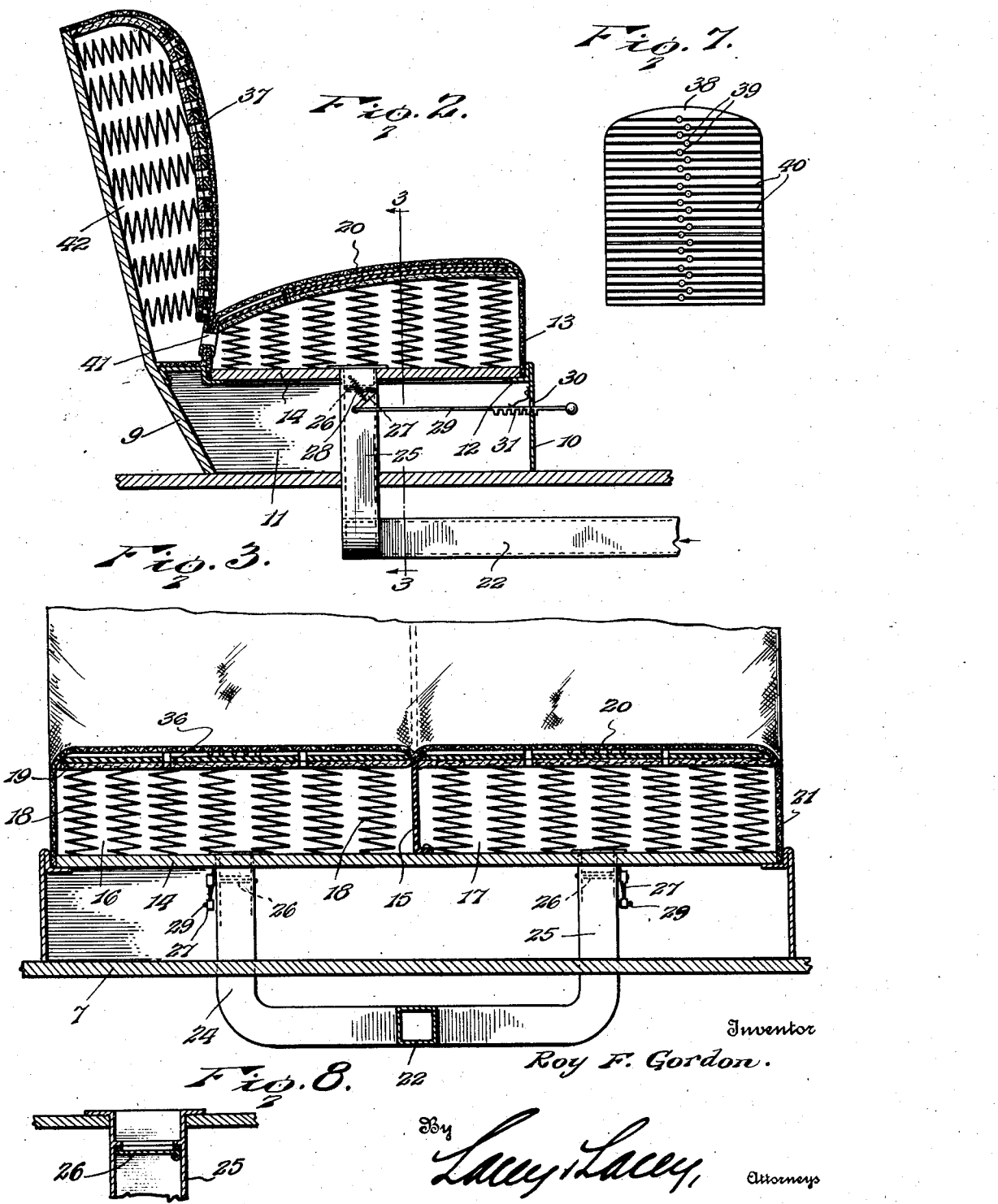

Patented Dec. 3, 1935

2,022,959

UNITED STATES PATENT OFFICE 2,022,959

SEAT VENTILATING AND COOLING DEVICE FOR AUTOMOBILES

Roy F. Gordon, Bennington, Nebr.

Application January 18, 1934, Serial No. 707,175

5 Claims. (Cl. 98—2)

This invention relates to ventilating devices for motor vehicles and more particularly to means for ventilating the seats thereof.

The object of the invention is to provide a ventilating device of inexpensive and thoroughly efficient construction which may be readily installed in any type of motor vehicle and by means of which small streams of air may be delivered beneath the driver's seat and other seats of an automobile so as to keep the surface of the seat cool and thus insure comfort of the passengers.

A further object of the invention is to provide the seat of the automobile with independent air compartments having pipes communicaing therewith and leading to a shutter controlled air inlet at the front of the vehicle, said pipes being provided with independent valves whereby the air may be directed into either one or both of the seat compartments.

A further object is to provide a novel form of air distributer adapted to be positioned beneath the seat covering and through which either cool or warm air may be uniformly distributed over the entire surface area of said seat.

A further object is to form the distributing member with a series of air ports or perforations so disposed that a person occupying the seat will normally close the perforations, there being air grooves or channels communicating with the perforations and extending medially of the seat as well as transversely and longitudinally thereof so as to insure effective cooling and ventilation of the seat irrespective of the movements of the occupant of the seat.

A still further object of the invention is generally to improve this class of devices so as to increase their utility, durability and efficiency.

In the accompanying drawings forming a part of this specification and in which like numerals of reference indicate corresponding parts in all the figures of the drawings, Figure 1 is a side elevation, partly in section, of a portion of a motor vehicle showing my improved ventilating device in position thereon.

Figure 2 is an enlarged vertical sectional view through the front seat of the automobile.

Figure 3 is a vertical sectional view taken on the line 3—3 of Figure 2.

Figure 4 is a plan view of the air distributing member.

Figure 5 is an enlarged sectional view taken on the line 5—5 of Figure 4.

Figure 6 is a horizontal sectional view of the inlet of the air conductor showing the construction of the air controlling shutters and latch for holding the shutters closed.

Figure 7 is a detail front elevation of one of the distributing mats or members for the back of the seat.

Figure 8 is a detail sectional view of one of the controlling valves.

The improved ventilating device, forming the subject-matter of the present invention, is principally designed for application to automobiles or other motor vehicles and by way of illustration is shown in connection with an automobile of standard construction in which 5 designates the body, 6 the hood and 7 the floor boards or platform on which is mounted the front seat, indicated in general by the numeral 8.

Secured to the platform 7 is a box frame 9 having upstanding front and side walls 10 and 11 preferably formed of metal with their upper edges bent inwardly to form retaining flanges 12 on which the removable seat cushion 13 rests in the usual manner. The seat cushion 13 comprises an air-tight base 14 to which is secured a vertical partition 15 preferably formed of rubber, rubberized cloth, or other air-proof flexible material and which serves to divide the seat cushion into independent air compartments 16 and 17. Arranged within the compartments 16 and 17 are coil springs 18, and fitted over the upper ends of the coil springs is a yieldable pad 19 formed of felt or other suitable material so as to give the seat a soft yieldable surface. The seat is provided with an exterior cover 20 which may be formed of velour or other material capable of permitting the passage of air therethrough, and the opposite ends and sides 21 of the cover 20 are preferably made of air and moisture proof material so as to prevent lateral escape of the air from the compartments 16 and 17. Arranged beneath the platform 7 and extending longitudinally of the automobile is an air conduit 22 having its outer end enlarged to form a mouth or entrance 23 disposed at the front of the machine and its inner end provided with branch pipes 24 and 25 which extend through openings in the platform 7 and corresponding openings in the base 14 and communicate with the interior of the adjacent air compartments 16 and 17 of the seat whereby when the vehicle is in motion, a continuous current of air will be delivered into said compartments. The branch pipes 24 and 25 are each provided with a cut-off valve 26 pivotally mounted within the pipe and provided with a crank arm 27 to which is secured a coil spring 28 for normally holding the valve closed. An operating rod 29 is connected with the crank arm 27 of each valve and extends through an opening 30 in the front wall 10 and is provided with a series of teeth or notches 31 adapted to engage the lower wall of the opening 30 for holding the valve in either open or closed position, or partially so.

Arranged within each compartment and interposed between the cover 20 and pad 19 is a distributing member 32 conforming to the shape of the seat and preferably formed of rubber or similar yieldable material so as not to interfere with the comfort of the occupant of the seat. This distributing member 32 is in the nature of a mat having a series of air ports or perforations 33 extending vertically therethrough and preferably disposed in staggered relation, as shown, with the lower ends of the ports communicating with the air compartments 16 and 17. These perforations 33 are preferably arranged in inverted U-form to conform to the buttocks and legs of a person and are so disposed with relation to the outer edge of the member 32 that when the seat is occupied, the occupant of the seat will normally close said perforations and cause the air to travel along grooves or channels 34 which communicate with the perforations, as best shown in Figure 5 of the drawings. The grooves or channels 34 are molded or otherwise formed in the upper surface of the distributing member or mat 32 and said air grooves or channels extend both transversely and longitudinally of the mat, as shown, so as to cause a uniform distribution of the air over the entire surface of the seat and thus cool and ventilate the seat and insure the comfort of the occupant thereof.

I preferably form the distributing member or mat with a plurality of auxiliary grooves or channels 35 disposed at the medial longitudinal plane of the mat and between the adjacent rows of perforations 33 and these auxiliary channels intersect certain of the channels 34 and also communicate with certain of the perforations 33 so that cool air will also be supplied at the medial portion of the mat. The pad 19 is provided with openings 36 which register with the perforations 33, and it will, of course, be understood that the air in the compartments 16 and 17 will pass through the perforations 33 and 36 and thence outwardly through a porous fabric constituting the cover 20 of the seat. Owing to the arrangement and disposition of the air channels 34 and perforations 33, the air will be uniformly delivered over the entire surface of the seat irrespective of any position or posture the driver or other occupant of the seat may assume. If desired, instead of providing a distributing member or mat 32 for each air compartment, a single distributing member may be provided which will extend across both compartments. When only a single person is using the automobile, as for instance the driver, the valve controlling the admission of air to one compartment is closed so that the volume of air passing through the conduit 22 will be delivered into the other compartment to effect the desired cooling operation of the surface of the seat. When both seats are occupied, however, both valves will be open, as will be readily understood, and it will also be understood that while the device is shown in connection with the front seat of an automobile only, the ventilating system may also be installed in the rear seat of the vehicle and in which event an auxiliary pipe will be connected with the air conduit 22 for supplying air to the rear seat in the manner previously described.

For supplying cool air to the back 37 of the seat, I preferably provide an air distributing mat 38 of the construction shown in Figure 7 of the drawings for each occupant of the seat. Each distributing mat for the back of the seat is provided with a central row of perforations 39 intersected by a plurality of spaced transversely disposed grooves or channels 40 which intersect the perforations, there being separate openings 41 formed in the seat 13 and communicating with separate air compartments 42 formed in the back and of the same construction as the air compartments in the seat so that a portion of the air within the seat compartments 16 and 17 will pass into the back compartments 42 and thence outwardly through the perforations and grooves in the adjacent distributing member 38 and through the covering of the back to effect cooling of the surface of said back. It will, of course, be understood that one of the distributing mats, shown in Figure 7 of the drawings, will be placed over each air compartment in the back and that said mats will be so disposed that the central openings 39 therein will be in line with the center of the air distributing mat of the seat. By having individual air compartments for the seat and back, connected in the manner described and each provided with an air distributing mat, it follows that if but one person is occupying the seat and the valve controlling flow of air through the conduit branch supplying air to the other portions of the seat and back is closed, only that portion of the back and seat that is occupied will be cooled and ventilated and that no air can escape through the adjacent or unoccupied portion of said seat and back.

In order to control the admission of air to the conduit 22, I mount a plurality of blades or shutters 43 in the enlarged mouth of the conduit, said shutters being pivotally mounted within the mouth and operatively connected by a rod 44. Secured to one of the blades or shutters 43 is a dished impact plate 45 and secured to the rod 44 is one end of a coil spring 46, the opposite end of which is secured to the adjacent wall of the conduit, as best shown in Figure 6 of the drawings. A nut 46' is preferably provided to regulate the tension of the spring. When the vehicle is traveling at normal speed, the air will enter the mouth of the conduit between the blades 43, but should the speed of the vehicle increase above a certain point the pressure of the air on the impact plate will move the shutters in a closing direction without entirely closing them. When the speed of the automobile is reduced, the spring 46 moves the shutters in an opening direction and decreases resistance to entrance of air. Therefore, a substantially uniform amount of air is allowed to pass through the conduit to the seat when traveling at high or low speed.

It will thus be seen that a constant stream of fresh air is supplied to the conductor 22 which is in turn delivered through the distributing mat and covering of both the seat and back so that a thin film of cool air is always present on these parts thereby rendering motoring a pleasure particularly in hot weather as a cool sanitary surface is always presented to the occupant of the seat or seats of the motor vehicle. If desired, a suitable fan may be mounted in the conductor 22 and operatively connected with a small motor so as to provide a forced draft under certain conditions, as for instance when the automobile is at rest, but in actual practice, it has been found that air entering the conduit through the shutter controlled mouth thereof is sufficient for cooling and ventilating the seats of the vehicle. It is essential that the branch pipes 24 and 25 be provided with independent valves for controlling the admission of air to the compartments 16 and 17 otherwise, if only one person is occupying a seat, and the perforations in the occupied seat are closed, the air will take the path of least resistance and escape through the covering of the adjacent seat without cooling the occupied seat and, therefore, the purpose of the invention would be defeated. By means of independent valves, however, should only one person occupy the vehicle, the valve controlling the unoccupied seat may be closed to permit cooling of the occupied seat and should both seats be occupied, both valves will be opened so that the seats will be simultaneously cooled and ventilated. It will, of course, be understood that as many air perforations and distributing grooves and channels may be formed in the mat 32 as is found desirable or necessary to produce the best results and I, therefore, do not desire to be limited to the exact construction shown.

It will also be understood that the devices may be made in different sizes and shapes and used for cooling and ventilating seats of any desired type or wherever it is desired to cool and ventilate a seating surface.

While it is preferred to position the air distributing member or mat beneath the cover of the seat, it is not absolutely necessary to do so as the mat may be placed on the outside of the cover or said mat used in lieu of the cover, in which event the mat itself will form the cover of the seat and constitute a seating surface. In winter, when cooling of the seat of the vehicle is not necessary or desirable, the shutters and valves are closed, there being a spring clip or latch, shown in Figure 6 of the drawings, secured to the mouth of the air conduit and adapted to engage the adjacent blade for holding the shutters closed.

While the device is primarily designed for cooling and ventilating the seats of automobiles in summer, it will be understood that said device may be used with equally good results for heating the surface of the seats in winter, in which event, the conductor will be connected with a source of hot air which will be delivered to the air compartments and distributed over the seating surface in the manner previously set forth.

Having thus described the invention, I claim:

1. In a motor vehicle, a seat having a cover and provided with an air compartment, an air conductor communicating with the compartment for discharging air through the cover, said conductor having an enlarged mouth disposed at the front of the vehicle, shutters fitted in the mouth of the conductor and pivotally mounted for movement into and out of a closed position, a rod connecting said shutters, a spring normally holding the shutters open, an arm extending from one shutter into the mouth of said conductor, and a shank extending downwardly at an inward incline from said arm and having an impact member at its lower end adapted to be acted upon by wind passing inwardly between the shutters and move the shutters toward a closed position.

2. A seat having an air compartment and provided with a cover, and an air distributing member comprising a flexible mat having perforations extending therethrough and arranged in substantially inverted U-form, the upper surface of the mat being grooved transversely and longitudinally to form main air channels communicating with the perforations, there being auxiliary air channels formed along the medial longitudinal line of the mat and communicating with certain of the perforations.

3. A seat having a porous cover and provided with an air compartment, and an air distributing member disposed under the cover, said member being formed with perforations disposed in position to be blocked by a person occupying the seat, and the upper face of the said member being formed with channels leading from said perforations for conducting streams of air under a person occupying the seat and cooling the seat.

4. A seat having a porous cover and provided with an air compartment, and an air distributing member disposed under the cover and consisting of a sheet of impervious material, said sheet having openings formed therein for passage of air from the air compartment through the sheet, certain of said openings being arranged in groups spaced from each other transversely of the sheet and in spaced relation to margins of the sheet, the outer face of the sheet being formed with channels extending from the openings toward margins of the sheet and with other channels extending from the openings between the groups of openings, the outer face of the sheet also being formed with channels in the portion of the sheet between the groups of openings leading from a margin of the sheet and communicating with the last mentioned channels.

5. A seat formed with an air compartment, and an air distributing member forming a flexible wall for the air compartment and consisting of a sheet of impervious material having air outlet openings formed therein and disposed in position to have their outer ends blocked by a person occupying the seat, the outer face of the sheet being formed with channels leading from the openings for conducting streams of air between the seat and a person occupying the seat and cooling the seat.

ROY F. GORDON. [L. S.]